(12) United States Patent
Noda

(10) Patent No.: US 7,733,068 B2
(45) Date of Patent: Jun. 8, 2010

(54) DC-DC CONVERTER

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/543,733

(22) Filed: Aug. 19, 2009

(65) Prior Publication Data

US 2010/0046250 A1   Feb. 25, 2010

(30) Foreign Application Priority Data

Aug. 20, 2008   (JP) .............................. 2008-211963

(51) Int. Cl.
*G05F 1/613* (2006.01)
(52) U.S. Cl. ................. 323/224; 323/284; 323/349
(58) Field of Classification Search ................. 323/224, 323/284, 349, 282
See application file for complete search history.

(56) References Cited

U.S. PATENT DOCUMENTS

| 2007/0176588 A1 * | 8/2007 | Nishida ....................... 323/284 |
| 2007/0222502 A1 * | 9/2007 | Noda |
| 2009/0066305 A1 * | 3/2009 | Noda |
| 2009/0115374 A1 * | 5/2009 | Noda |

FOREIGN PATENT DOCUMENTS

| JP | 2004-56982 | * | 2/2004 |
| JP | 2005-160224 | * | 6/2005 |
| JP | 2006-34033 | * | 2/2006 |
| JP | 2006-60977 | * | 3/2006 |
| JP | 2006-109535 | * | 4/2006 |
| JP | 2007-116878 | * | 5/2007 |
| JP | 2008-199804 | * | 8/2008 |
| JP | 2009-71920 | * | 4/2009 |
| JP | 2009-130972 | * | 6/2009 |
| WO | WO 2007/094246 A1 | * | 8/2007 |

* cited by examiner

*Primary Examiner*—Shawn Riley
(74) *Attorney, Agent, or Firm*—Cooper & Dunham LLP

(57) ABSTRACT

A DC-DC converter includes a switching transistor connected to an inductor and a power input terminal, with the inductor connected to an output terminal, a synchronous rectification transistor connected to a junction node therebetween, a first electric current detector to detect whether or not an electric current flowing through the synchronous rectification transistor is larger than a first electric current, a second electric current detector to detect whether or not the electric current flowing through the synchronous rectification transistor is larger than a second electric current that is larger than the first electric current, and a selection mechanism to select one of the first and second electric current detectors in accordance with a control signal. The synchronous rectification transistor is turned off by outputting an output signal the selected current detector.

12 Claims, 6 Drawing Sheets

DC-DC CONVERTER

CROSS-REFERENCE TO RELATED APPLICATIONS

This patent specification claims priority from Japanese Patent Application No. 2008-211963, filed on Aug. 20, 2008 in the Japan Patent Office, which is hereby incorporated by reference herein in its entirety.

BACKGROUND OF THE INVENTION

1. Field of the Invention

The present invention relates to a synchronous rectification DC-DC (direct current to direct current) converter.

2. Discussion of the Background

Contemporary electronic devices are advanced and perform various sophisticated operations. For example, mobile phones frequently play recorded videos as well as still images.

As a result, the performance of a CPU (central processing unit) used in the devices is also enhanced, and the CPU operates at an increased clock speed.

However, when the clock speed is increased, the power consumed by the CPU increases in proportion to the frequency of the clock, which is a problem in a device with a limited power supply such as a mobile phone or the like. Further, in order to increase the clock speed, a higher supply voltage is required. As a result, electric power consumption is increased.

To solve this problem, there are devices in which, when the device operates normally, the supply voltage is reduced and the device operates at a lower clock speed, thus reducing power consumption. By contrast, when high-speed processing (e.g., video processing) is required, the supply voltage is increased and the device is operated at a higher clock speed. Thus, this known technique can minimize the power consumption increase in the overall device.

Part of the circuit architecture described above relies on power source circuits for mobile electronic devices such as synchronous rectification DC-DC converters, which include an inductor that can be compact. Such DC-DC converters are effective and widely used.

In a discontinuous mode, DC-DC converters with synchronous rectifier are susceptible to the occurrence of a reverse current, meaning that the electrical current flows to a ground terminal from an output terminal connecting to a load circuit through the inductor and a synchronous rectification transistor. When a reverse current occurs, power conversion efficiency of the DC-DC converter in particularly is impaired.

To prevent reverse current, the DC-DC converter is provided with a reverse current prevention circuit that forcibly shuts down the synchronous rectification transistor when a reverse current occurs.

Herein, in a case in which the output voltage of the DC-DC converter changes from a higher voltage to a lower voltage, when the load current is low, it takes a longer time for a capacitor connected to the output terminal to discharge, and consequently, reduction of the output voltage requires a longer time. A similar problem occurs when the power supply is turned off.

By contrast, in a case in which the output voltage changes from a lower voltage to a higher voltage, because a time period during which a switching transistor of DC-DC converter is on is set as long as possible, the possibility of occurrence of overshoot that is when the output voltage exceeds a predetermined value increases. When the overshoot is generated, the DC-DC converter operates similarly to when the output voltage changes from the higher voltage to the lower voltage, and therefore, the overshoot period is increased. Here too, a similar problem occurs when the power supply is turned on.

To solve the above-described problem, several approaches as described below have been disclosed.

In one approach, when the power supply is turned off, a reverse current of the synchronous rectification transistor is permitted until the output voltage is decreased to a predetermined voltage. Then, the electric charge in the output capacitor is discharged rapidly by the reverse current of the synchronous rectification transistor, and the speed with which the voltage at the power off is decreased can be accelerated. When the output voltage has decreased to the predetermined voltage, reverse current prevention processing in which the synchronous rectification transistor is forcibly turned off at the occurrence of a reverse current is reactivated.

Consequently, an inductor current is sent to the input voltage via a dependent diode that is formed on the switching transistor.

Further, when the output voltage changes, the reverse current of the synchronous rectification transistor is allowed as described above. Therefore, when the output voltage is higher than a target voltage and is in the discontinuous mode, a reverse current occurs, and the electric charge in the output capacitor is discharged via the inductor and the synchronous rectification transistor. Consequently, the response speed of the output can be accelerated.

However, in the above-described approach, while the output voltage changes, the period during which the reverse current occurs is not controlled. Namely, the electrical current keeps flowing in reverse until a next sequence starts, that is, the switching transistor is turned on and the synchronous rectification transistor is turned off. Consequently, as the electric load current decreases, the period during which the reverse current occurs lengthens. Additionally, because the reverse current is increased over time, when the electric load current is lower, undershoot of the output voltage may be generated.

Further, after the output voltage changes to the predetermined voltage, the reverse voltage prevention processing in which the synchronous rectification transistor is forcibly turned off when a reverse current occurs is executed again. At that time, the electricity stored in the inductor for supplementing the reverse current is excessive, and as a result, the overshoot occurs.

Moreover, because the above-described approach takes no countermeasures when the power is turned on, the overshooting generated immediately after the power on cannot be prevented.

SUMMARY OF THE INVENTION

In view of the foregoing, one illustrative embodiment of the present invention provides a DC-DC converter that includes a switching transistor including a first terminal connected to a power input terminal, an inductor including a first end connected to a second terminal of the switching transistor and a second end connected to an output terminal, a synchronous rectification transistor including a first terminal connected to a junction node between the switching transistor and the inductor and a second terminal connected to a ground terminal, a first electric current detector to detect whether or not an electric current flowing through the synchronous rectification transistor is larger than a first electric current, a second electric current detector to detect whether or not the electric current flowing through the synchronous rectification transistor is larger than a second electric current that is larger than the first electric current and flows in a positive direction, and a selection mechanism to select one of the first electric current detector and the second electric current detector in accordance with a control signal. The synchronous rectification transistor is turned off by an output signal from one of the first electric current detector and the second electric current detector that is selected, and while the synchronous rectification transistor is on, a direction of the electrical current flowing through the synchronous rectification transistor is as the positive direction when the electrical current flows from the junction node to the ground terminal and as a negative direction when the electrical current flows from the ground terminal to the junction node.

Another illustrative embodiment of the present invention provides a DC-DC converter includes above-described a switching transistor, an inductor and a synchronous rectification transistor, and further includes a first voltage detector to detect whether or not a voltage of a junction node between the switching transistor and the inductor is higher than a first voltage, a second voltage detector to detect whether or not a voltage of the junction node between the switching transistor and the inductor is higher than a second voltage that is larger than the first voltage and in a positive voltage, and a selection mechanism to select one of the first voltage detector and the second voltage detector in accordance with a control signal. The synchronous rectification transistor is turned off with an output signal from one of the first voltage detector and the second voltage detector that is selected.

Another illustrative embodiment of the present invention provides a DC-DC converter includes above-described a switching transistor, an inductor and a synchronous rectification transistor, and further includes a current-voltage converting device to convert an electric current flowing through the synchronous rectification transistor into a voltage, a first reference voltage output mechanism to output a first reference voltage that is 0 V or near 0 V, a second reference voltage output mechanism to output a second reference voltage that is higher than the first reference voltage and is positive, a selection mechanism to receive both the first reference voltage and the second reference voltage and output one of the first reference voltage and the second reference voltage in accordance with a control signal, and a comparator that compares the output voltage from the current-voltage converting device with the first reference voltage or the second reference voltage outputted from the selection mechanism, and outputs a signal to turn off the synchronous rectification transistor when detecting that the output voltage from the current-voltage converting device is not lower than the first reference voltage or the second reference voltage selected by the selection mechanism.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
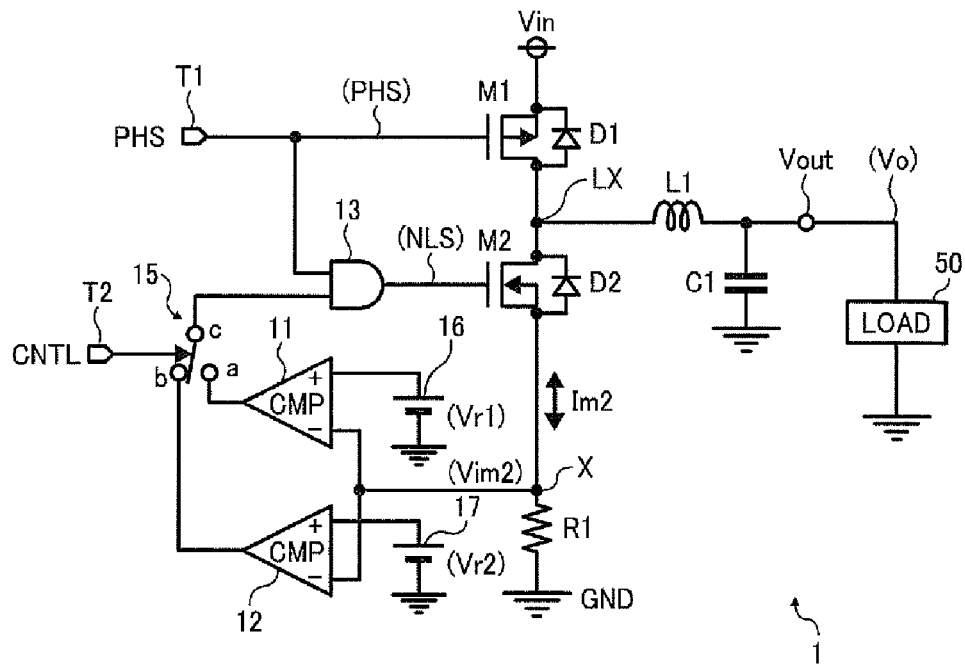
FIG. 1 illustrates circuitry of an output portion of a DC-DC converter according to an illustrative embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIGS. 1 through 4, a DC-DC converter according to a first embodiment of the present invention is described below.

First Embodiment

FIG. 1 illustrates circuitry of an output portion of a DC-DC converter 1 according to the present embodiment. The output portion of the DC-DC converter 1 includes comparators 11 and 12, an AND circuit 13, a switch 15, a first reference voltage source 16, a second reference voltage source 17, a switching transistor M1, a synchronous rectification transistor M2, a resistor R1, an inductor L1, and a capacitor C1. It is to be noted that a diode D1 is a dependent diode parasitic to the switching transistor M1, and a diode D2 is a dependent diode parasitic to the synchronous rectification transistor M2.

Further, the output portion of the DC-DC converter 1 includes a power input terminal Vin, an output terminal Vout, a ground terminal GND, and internal terminals T1 and T2. An input voltage V1 is applied between the power input terminal Vin and the grand terminal GND, and an output voltage Vo of the DC-DC converter 1 is outputted from the output terminal Vout, and thus, power is supplied to a load 50.

A signal to control the DC-DC converter 1 is input from the internal terminals T1 and T2.

As a method for controlling the DC-DC converter, either pulse-width modulation (PWM), in which a duty cycle of a clock pulse having a constant frequency is varied so as to keep the output voltage at a constant voltage, or pulse frequency modulation (PFM), in which a cycle of the clock is varied at a constant clock-pulse width so as to keep the output voltage at the constant voltage, can be used.

Figure 2:
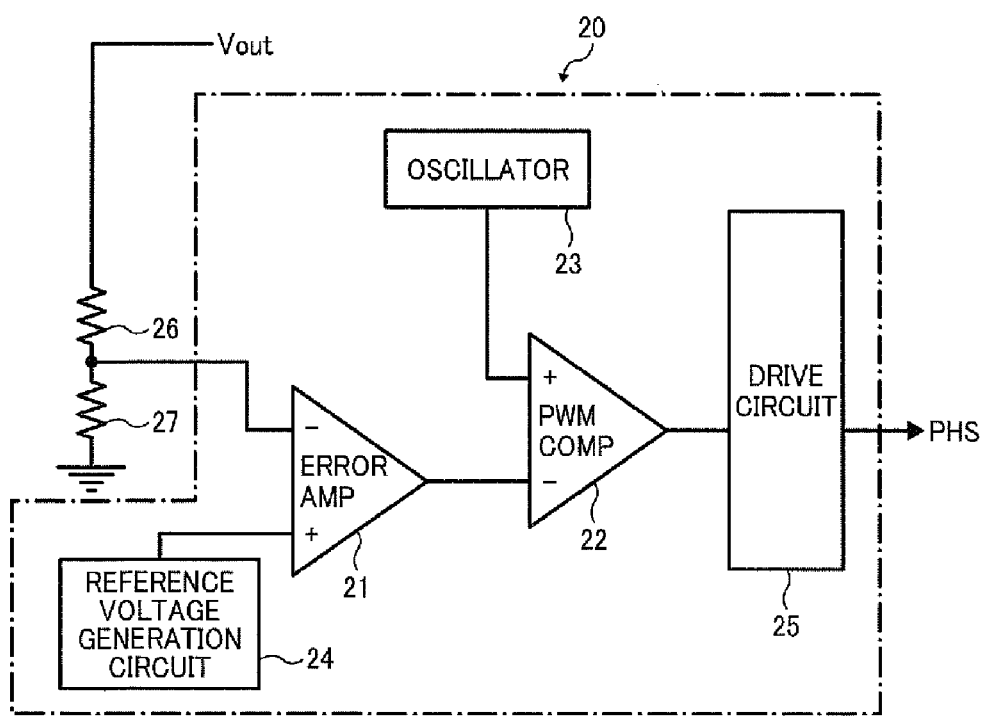
FIG. 2 shows circuitry illustrating a configuration of a switching control circuit with PWM control to be used in the DC-DC converter.

FIG. 2 shows circuitry illustrating a configuration of a switching control circuit 20 with PWM control. The switching control circuit 20 shown in FIG. 2 transmits a control signal (that is, a switching signal PHS) to the internal terminal T1. The internal terminal T1 receives the switching signal PHS so as to turn on or off the switching transistor M1. The internal terminal T2 receives a control signal CNTL that is a signal different from the switching signal PHS and controls the synchronous rectification transistor M2.

The switching transistor M1 is a PMOS (P-channel metal-oxide semiconductor) transistor. A source of the switching transistor M1 is connected to the power input terminal Vin and a drain thereof is connected to one terminal of the inductor L1. Reference character LX (shown in FIG. 1) represents a junction node between the switching transistor M1 and the inductor L1. Further, a gate thereof is connected to the inner terminal T1 and receives the switching signal PHS.

A dependent diode D1 is formed on the switching transistor M1. In the switching transistor M1, a cathode terminal and an anode terminal of the dependent diode D1 are respectively connected to the source and the drain of the switching transistor M1.

The other terminal of the inductor L1 is connected to the output terminal Vout. The capacitor C1 is connected between the output terminal Vout and the ground terminal GND.

A drain of the synchronous rectification transistor M2 is connected to the junction node LX, and its source is connected to the ground terminal GND via the resistor R1. Its gate is connected to an output terminal of the AND circuit 13. The dependent diode D2 is formed on the synchronous rectification transistor M2, and its cathode and anode are respectively connected to the drain and the source of the synchronous rectification transistor M2.

The resistor R1 converts an electrical current Im2 that flows through the synchronous rectification transistor M2 to a voltage signal Vim2, serving as a current-voltage converter. The voltage signal Vim2 at a junction node X between the source of the synchronous rectification transistor M2 and the resistor R1 is proportional to the electric current Im2 that flows through the synchronous rectification transistor M2. Thus, the electric current Im2 that flows through the synchronous rectification transistor M2 can be detected by the voltage signal Vim2.

In the comparator 11, a non-inverting input terminal is connected to the first reference voltage source 16 and receives a first reference voltage Vr1 generated in the first reference voltage source 16, and an inverting input terminal is connected the junction node X between the source of the synchronous rectification transistor M2 and the resistor R1 and receives the voltage signal Vim2. Further, an output terminal thereof is connected to a contact a of the switch 15.

The comparator 11 compares the first reference voltage Vr1 with the voltage signal Vim2 that is converted from the electric current Im2, where the first reference voltage Vr1 corresponds to a first electric current value. In the present embodiment, the comparator 11 serves as a first electric current detector.

The first reference voltage Vr1 is set to 0 V (volts), which is the same as the electrical potential at the ground terminal GND or nearly 0 V. Therefore, the value of first electric current takes 0 A (amperes) or nearly 0 A. Although the first reference voltage Vr1 is a positive value in the circuitry in FIG. 1, the first reference voltage Vr1 can also be a negative value. Alternatively, the inverting input terminal of the comparator 11 can be directly connected to the ground terminal.

In the comparator 12, a non-inverting input terminal is connected to the second reference voltage source 17 and receives a second reference voltage Vr2 generated in the second reference voltage source 17. An inverting input terminal thereof is connected to the junction node X between the synchronous rectification transistor M2 and the resistor R1, similar to the inverting input terminal of the comparator 11. Further, an output terminal thereof is connected to a contact b of the switch 15.

The comparator 12 compares the second reference voltage Vr2 with the voltage signal Vim2 that is converted from the electric current Im2 flowing through the synchronous rectification transistor M2. Therefore, the second reference voltage Vr2 corresponds to a second electric current value. In the present embodiment, the comparator 12 serves as a second electric current detector.

The second reference voltage Vr2 is a positive voltage that is significantly higher than the first reference voltage and lower than the output voltage Vo of the DC-DC converter.

A common contact c of the switch 15 is connected to a second input terminal of the AND circuit 13. Further, a control terminal of the switch 15 is connected to the internal terminal T2 and is supplied with the control signal CNTL.

In accordance with the control signal CNTL, the output signal of either the comparator 11 or the comparator 12 is selected, and the selected output signal is transmitted to the second input terminal of the AND circuit 13. The switch 15 serves as a selection mechanism.

A first input terminal of the AND circuit 13 is connected to the internal terminal T1 and receives the switching signal PHS. An output terminal of the AND circuit 13 is connected to the gate of the synchronous rectification transistor M2, and an output signal NLS is outputted from the output terminal of the AND circuit 13 to the gate of the synchronous rectification transistor M2.

When the output signal NLS is in high state (is high), the synchronous rectification transistor M2 is turned ON, and when the output signal NLS is low, the synchronous rectification transistor M2 is turned off. In the present specification, when the output signal NLS is high, a direction in which the electric current flows through the synchronous rectification transistor M2 from the junction node LX to the ground terminal is regarded as a positive direction, and the opposite direction thereof is regarded as a negative direction.

Next, switching control with PWM is described with reference to FIG. 2. The switching control circuit 20 shown in FIG. 2 includes an error amplifier circuit (Error AMP) 21, a PWM comparison circuit (PWM COMP) 22, an oscillator 23, a reference voltage generation circuit 24, and a drive circuit 25.

Resistors 26 and 27 receive the output voltage Vo from the output terminal Vout. The output voltage Vout is divided by the resistors 26 and 27, and the divided voltage is input to an inverting input terminal of the error amplifier circuit 21. A non-inverting input terminal of the error amplifier circuit 21 receives a reference voltage Vref from the reference voltage generation circuit 24. An output signal from the error amplifier circuit 21 is transmitted to an inverting input terminal of the PWM comparison circuit 22. A non-inverting input terminal of the PWM comparison circuit 22 receives a triangular wave signal from the oscillator 23. The PWM comparison circuit 22 compares the output voltage (output signal) from the error amplifier circuit 21 with the triangular wave signal from the oscillator 23 and generates a pulse signal for PWM control.

The pulse signal from the PWM comparison circuit 22 is transmitted to the drive circuit 25. The drive circuit 25 generates the signal PHS so as to turn on or off the switching transistor M1.

In the above-described DC-DC converter 1, when the switching transistor M1 executes the switching operation and is turned on, an electric current flows through the inductor L1. At that time, the synchronous rectification transistor M2 is off.

Referring to FIGS. 1 and 2, when the switching transistor M1 is turned off, the synchronous rectification transistor M2 is turned on, and electricity stored in the inductor L1 is discharged through the synchronous rectification transistor M2. The electric current thus generated is smoothed by the capacitor C1 and is outputted from the output terminal Vout to the load 50. The output voltage Vo outputted from the output terminal Vout is divided by the resistors 26 and 27 respectively used as a first output voltage detector and a second output detector, and the divided voltage is inputted to the inverting input terminal of the error amplification circuit 21.

When the output voltage Vo of the DC-DC converter is increased, the output voltage of the error amplifier circuit 21 is decreased, and the duty cycle of the pulse signal from the PWM comparison circuit 22 is shorter. Thus, the output voltage Vo is controlled to decrease. By contrast, when the output voltage VO of the DC-DC converter is decreased, the output voltage of the error amplifier circuit 21 is increased, and the duty cycle of the pulse signal from the PWM comparison circuit 22 is longer. Then, the DC-DC converter executes the opposite of above-described operation.

As a result, the DC-DC converter is controlled so as to keep the output voltage Vo at a constant voltage.

Figure 3:
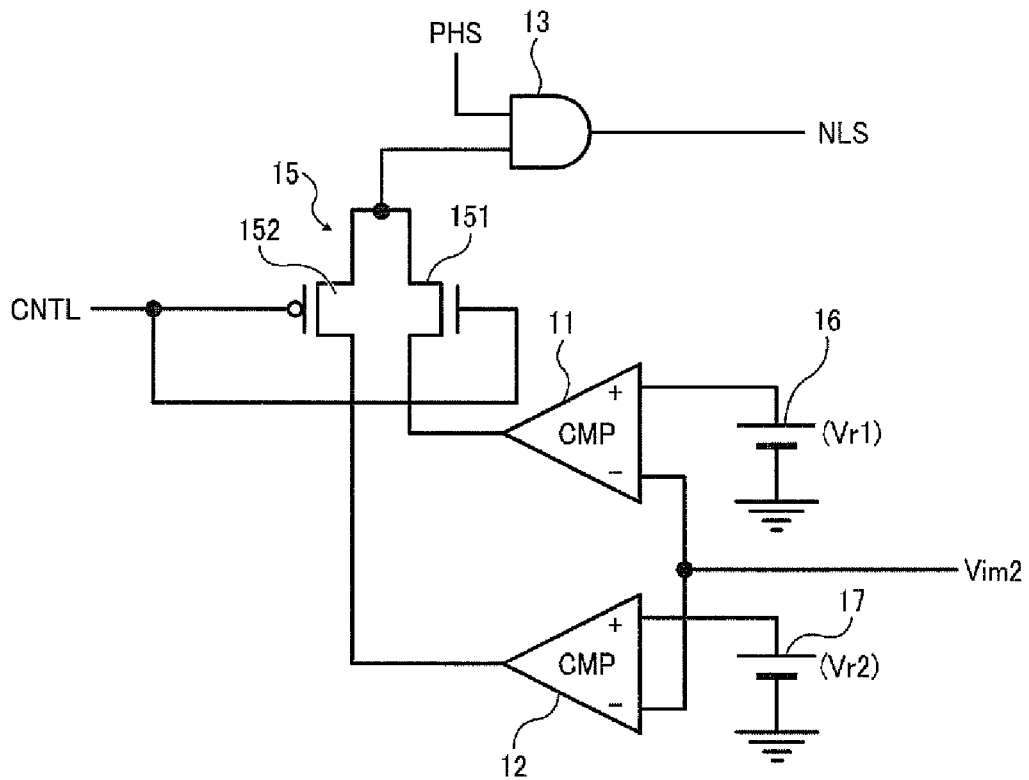
FIG. 3 shows circuitry illustrating a configuration of a switch used in the DC-DC converter shown in FIG. 1 when the switch is configured with transistors.

FIG. 3 illustrates circuitry near the switch 15 when the switch 15 is configured with transistors, that is, one configuration of the switch 15. In this configuration, the switch 15 is configured with an N-channel transistor 151 and a P-channel transistor 152.

A drain of the transistor 151 is connected to the output terminal of the comparator 11, and this connection functions as an equipment of the contact a described above. A source of the transistor 152 is connected to the output terminal of the comparator 12, and this connection functions as an equipment of the contact b described above. A source of the transistor 151 is connected to a drain of the transistor 152, and a junction point therebetween is the common contact c. The common contact c is connected to the second input terminal of the AND circuit 13.

Gates of the transistors 151 and 152 are supplied with the control signal CNTL outputted from the drive circuit 25. In accordance with the control signal CNTL, when the transistor 151 is on, the transistor 152 is turned off, and when the transistor 152 is on, the transistor 151 is turned off. Namely, in accordance with the control signal CTNL, one of the output signals from the comparator 11 and the comparator 12 is selected, and the selected output signal is transmitted to the second input terminal of the AND circuit 13.

Next, the operation of the circuit in the present embodiment is described below with reference to FIG. 4, which is a timing chart of the operations in the present embodiment.

Figure 4:
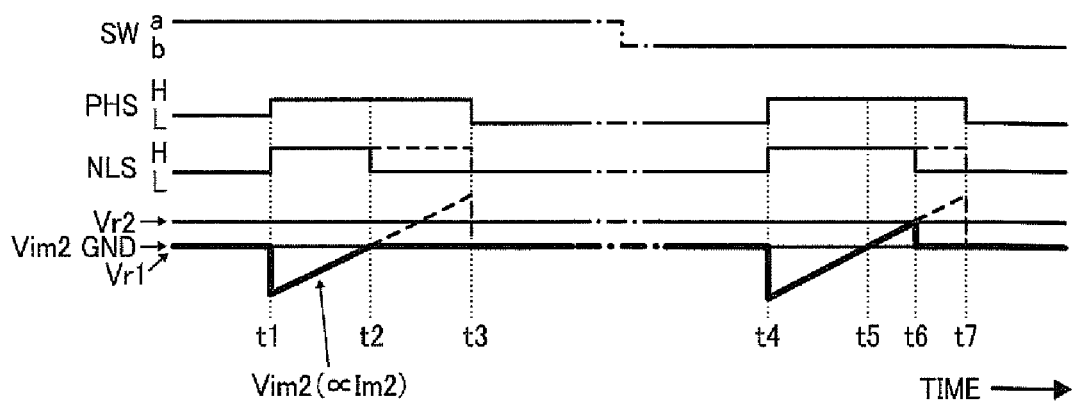
FIG. 4 is a timing chart of the DC-DC converter shown in FIG. 1.

In FIG. 4, reference characters SW represents the operation of the switch 15 showing which one of contacts a and b to be connected to the common contact c is selected, and PHS represents the switching signal that is inputted to the internal terminal T1 from the switching control circuit 20 with PWM control. The switching signal PHS is transmitted to the gate of the switching transistor M1 and the first input terminal of the AND circuit 13. Reference characters NLS represent the output signal from the AND circuit 13, and the signal NLS is transmitted to the gate of the synchronous rectification transistor M2.

Reference characters Vim2 represents the voltage signal of the junction node X between the source of the synchronous rectification transistor M2 and the resistor R1. Because the electric current Im2 flowing through the synchronous rectification transistor M2 flows though the resistor R1, the voltage Vim2 is proportional to the electric current Im2. The signal Vr2 represents the second reference voltage. Reference characters Vr1 and Vr2 respectively represent the first reference voltage and the second reference voltage, which are overlapped with the ground terminal voltage of 0 V.

When the DC-DC converter 1 operates normally, the contact c of the switch 15 is connected to the contact a, corresponding to the control signal CNTL. Under this condition, just before a time point t1 in FIG. 4, the switching signal PHS is low, and the switching transistor M1 is on. However, the signal inputted to the first input terminal of the AND circuit 13 is low, and therefore, the output signal NLS of the AND circuit 13 is low and the synchronous rectification transistor M2 is off.

When the synchronous rectification transistor M2 is off, the electric current Im2 does not flow through the resistor R1, and a voltage drop is not generated in the resistor R1. Therefore, the voltage Vim2 remains at 0 V.

Herein, because the first reference voltage Vr1 applied to the non-inverting input terminal of the comparator 11 is 0 V or near 0 V, the output signal of the comparator 11 is unstable, that is, it is not determined whether the output signal is in a high level or in a low level. The output signal of the comparator 11 is transmitted to the second input terminal of the AND circuit 13 via the switch 15.

When the switching signal PHS becomes high at the time point t1, the switching transistor M1 is turned off. Under this condition, when the output signal of the comparator 11 is high, both signals output from the first and the second input terminals of the AND circuit 13 become high. Therefore, the output signal NLS from the AND circuit 13 becomes high immediately, and the synchronous rectification transistor M2 is turned on.

When the output signal of the comparator 11 is low immediately before the time point t1, the switching transistor is turned off, a back electromotive force is generated in the inductor L1 and the voltage value at the junction node LX substantially decreases to negative voltage. Then, the electric current Im2 flows in the negative direction from the ground terminal GND to the junction node LX via the resistor R1 and the dependent diode D2, and therefore, the voltage Vim changes to a negative voltage. As a result, the output signal of the comparator 11 becomes high. Consequently, regardless of the state immediately before the time point t1, when the switching transistor M1 is turned off, the output signal of the comparator 11 becomes high, and therefore, the synchronous rectification transistor M2 is turned on.

Subsequently, an inductor electric current immediately before the time point t1 flows through the synchronous rectification transistor M2, and therefore, the electric current Im2 flows in the negative direction from the ground terminal GND to the junction node LX. As a result, a voltage drop is generated in the resistor R1, and the voltage Vim2 is considerably decreased.

Herein, as the electric current Im2 flowing through the synchronous rectification transistor M2 in the negative direction is decreased over time, the voltage drop at the resistor R1 gets smaller, and the voltage Vim2 is gradually increased.

When the voltage Vim2 reaches the first reference voltage Vr1 at a time point t2 in FIG. 4, the output signal of the comparator 11 becomes low. That is, the comparator 11 detects that the electric current flowing through the synchronous rectification transistor M2 is larger than the first electric current value, serving as the first electric current detector. Then, the output signal NLS of the AND circuit 13 becomes low, and the synchronous rectification transistor M2 is turned off. As a result, the reverse current that could be generated during a time period from the time point t2 to time point t3 at which the synchronous rectification transistor M2 is next turned on can be prevented as indicated by dashed line segments in FIG. 4.

Next, the operation to turn on/off the power supply of the DC-DC converter 1, or that to change the output voltage thereof, is described below with reference to FIG. 4. Immediately before turning the power supply on/off or changing the output voltage, the connection of common contact c is switched to contact b from contact a, and the switch 15 is connected to the comparator 12.

Then, the output signal of the comparator 12 is supplied to the second input terminal of the AND circuit 13. The states of the respective signals immediately before a time point t4 are exactly the same as those immediately prior to the time point t1 except that the output signal of the comparator 12 is stable at a high level and the signal inputted to the second input terminal of the AND circuit 13 is high.

The operation performed when the switching signal PHS becomes high at the time point t4 is exactly the same as the operation performed at the time point t1, and therefore a description thereof is omitted.

However, because the second input terminal of the AND circuit 13 is connected to the output terminal of the comparator 12, the synchronous rectification transistor M2 is not turned off even when the voltage Vim2 reaches the first reference voltage Vr1 at a time point t5.

At a time point t6 in FIG. 4, the voltage Vim2 reaches the second reference voltage Vr2, and accordingly the output signal of the comparator 12 become low. In other words, the comparator 12 detects that the current flowing through the synchronous rectification transistor M2 is larger than the second electric current voltage. The low level output signal is supplied to the second input terminal of the AND circuit 13, and the output signal NLS of the AND circuit 13 becomes low. Then, the synchronous rectification transistor M2 is turned off. In other words, during a time period from the time point t5 to the time point t6, the electric current flows in the positive direction from the junction node LX to the ground terminal GND, and thus the reverse current occurs.

At a time point t7 shown in FIG. 4, when the switching signal PHS becomes low, the switching transistor M1 is turned on. The synchronous rectification transistor M2 remains off at the time point t6, and therefore, the reverse current that could be generated during a time period from the time point t6 to the time point t7 at which the switching transistor M1 is next turned on can be prevented as indicated by dashed line segments shown in FIG. 4.

Because of the reverse current, the electrical charge stored in the capacitor C1 that is connected to the output terminal Vout can be discharged quickly, and therefore, the output voltage Vo can be set to the target voltage quickly. Moreover, due to the second reference voltage Vr2, the amount of the electric current that flows in reverse can be set, and therefore, undershoot induced by an excessive reverse current can be prevented.

It is to be noted that the period required for the output voltage Vo to reach the target voltage is estimated in advance, and when the estimated time has elapsed, the control signal CTNL causes the common contact c to connect to the contact a in the switch 15. Therefore, the reverse current can be generated only when required.

Second Embodiment

Figure 5:
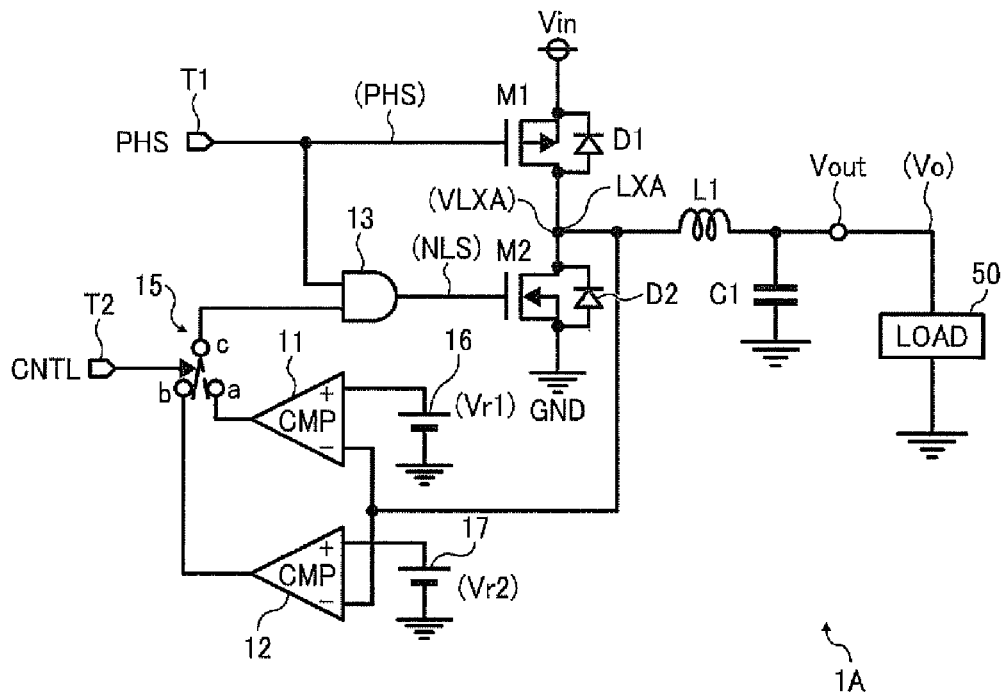
FIG. 5 illustrates circuitry of an output portion of a DC-DC converter according to another embodiment.

Next, a second embodiment of the present invention is described below. FIG. 5 illustrates circuitry of an output portion of a DC-DC converter 1A according to the second embodiment.

In contrast to the first embodiment, in the second embodiment the resistor R1 is removed and the source of the synchronous rectification transistor M2 is directly connected to the ground terminal GND, and the inverting terminals of the comparator 11 and the comparator 12 are connected to a junction node LXA.

Then, in the second embodiment, the comparator 11 serves as the first voltage detector, and the comparator 12 serves as the second voltage detector. The remainder of the configuration is similar to that of the first embodiment, and therefore a description thereof is omitted.

The operation of the circuit in the present embodiment is described below with reference to FIG. 6, which is a timing chart of the operation in the second embodiment.

Figure 6:
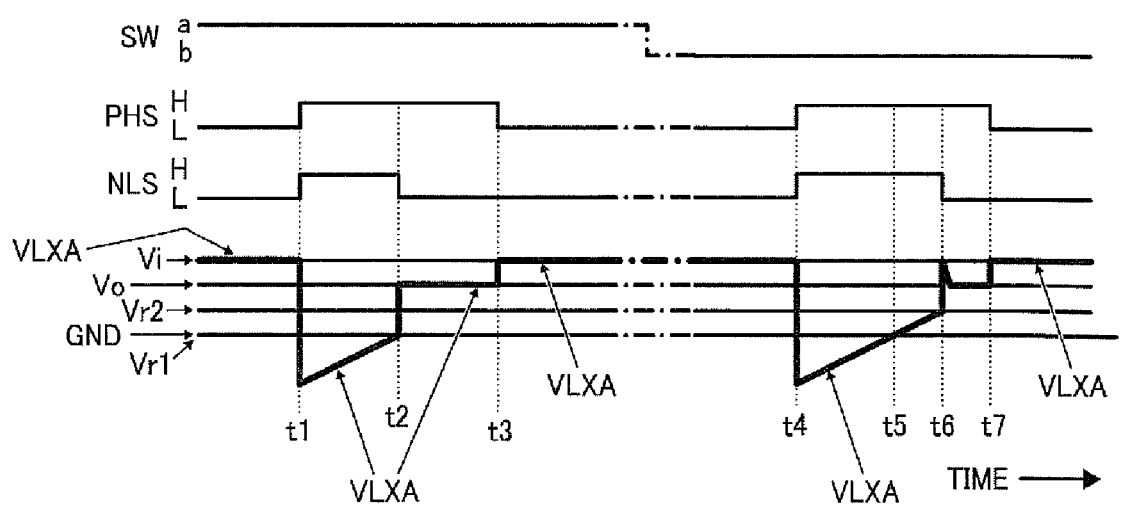
FIG. 6 is a timing chart of an operation in the DC-DC converter shown in FIG. 5.

In FIG. 6, reference character VLXA represent a voltage of the junction node LXA between the synchronous rectification transistor M2 and the inductor L1. Reference character Vi represent an input voltage of the power input terminal Vin, reference character Vo represent the output voltage outputted from the output terminal Vout, and reference characters Vr2 and reference characters Vr1 respectively represent the second reference voltage and the first reference voltage, which are overlapped with the ground terminal GND of 0 V.

When the DC-DC converter 1A operates normally, the contact c of the switch 15 is connected to the contact a. Under this condition, just before a time point t1 in FIG. 6, the switching signal PHS is low, and the switching transistor M1 is on state. Further, the signal PHS inputted to the first input terminal of the AND circuit 13 is low, and therefore, the output signal NLS from the AND circuit 13 is low and the synchronous rectification transistor M2 is off. Therefore, the voltage VLXA of the junction node LXA is almost the same as the input voltage Vi.

Because the inverting terminal of the comparator 11 is connected to the junction node LXA, the voltage close to the input voltage Vi is applied thereto. Further, the non-inverting terminal of the comparator 11 receives the first reference voltage Vr1 that is 0 V or near 0 V, and therefore, the output of the comparator 11 becomes low.

When the switching signal PHS becomes high at the time point t1, the switching transistor M1 is turned off. Then, a back electromotive force is generated in the inductor L1, and the voltage value at the junction node LXA substantially decreases to negative voltage. Under this condition, an output signal of the comparator 11 becomes high, and a second input terminal of the AND circuit 13 becomes high. Therefore, the output signal NLS from the AND circuit 13 becomes high, and the synchronous rectification transistor M2 is turned on.

Subsequently, an inductor electric current just before the time point t1 flows through the synchronous rectification transistor M2, and therefore, a negative electric current Im2 flows from the ground terminal GND to the junction node LXA. A voltage that is determined by multiplying the negative electric current Im2 and an ON resistance of the synchronous rectification transistor M2 is generated at the junction node LXA. Then, as the negative electric current Im2 flowing through the synchronous rectification transistor M2 is decreased over time, the electrical potential VLXA of the junction node LXA is increased.

When the voltage VLXA reaches the first reference voltage Vr1 at a time point t2 in FIG. 6, the output signal of the comparator 11 becomes low. Then, the output signal NLS of the AND circuit 13 becomes low, and the synchronous rectification transistor M2 is turned off. Because an inductor current when the synchronous rectification transistor M2 is turned off is almost 0 V, the back electromotive force is not generated in the inductor L1, and the voltage VLXA becomes equal to the output voltage Vo.

That is, a reverse current that could be generated during a time period from the time point t2 to a time point t3 at which the switching transistor M1 is next turned on can be prevented.

Next, the operation when the power supply of the DC-DC converter 1 is turned on/off, or when the output voltage thereof is changed, is described below.

Immediately before the power supply is turned on/off or the output voltage is changed, the connection of the common contact c is switched to the contact b from the contact a in the switch 15. Then, the output signal of the comparator 12 is supplied to the second input terminal of the AND circuit 13. The states of the signals immediately before a time point t4 are identical to those immediately before the time t1, and therefore a description thereof is omitted.

The operation when the switching signal PHS is turned off is similar to that performed immediately before the time point t1, except that the comparator 11 is changed to the comparator 12, and the description thereof is omitted.

However, because the second input terminal of the AND circuit 13 is connected to the output terminal of the comparator 12, the synchronous rectification transistor M2 is not turned off even when the voltage VLXA reaches the first reference voltage Vr1 at a time point t5.

At a time point t6 in FIG. 6, the voltage VLXA reaches the second reference voltage Vr2, and the synchronous rectification transistor M2 is turned off. Then, the electricity stored in the inductor L1 creates a back electromotive force, which increases the voltage VLXA rapidly, and the voltage VLXA is discharged through the synchronous rectification transistor M2. Consequently, an inductor current is sent to the input voltage Vi via a dependent diode D1 that is formed on the switching transistor M1.

When the electricity stored in the inductor L1 decreases, the voltage VLXA gradually decreases to the output voltage Vo.

As described above, during a time period from the time point t6 to a time point t7, a reverse is generated. Therefore, similarly to the first embodiment, due to the reverse current, the charge contained in the capacitor C1, which is connected to the output terminal Vout, can be rapidly discharged. As a result, the output voltage Vo can be set to a target voltage quickly. Moreover, because the voltage of the second reference voltage Vr2 can set the amount of the reverse current, undershoot induced by an excessive reverse current can be prevented.

At a time point t7, the switching signal PHS becomes low and the switching transistor M1 is turned on. At that time, because the synchronous rectification transistor M2 remains off, the voltage of the junction node LXA becomes equal to the input voltage Vi.

Third Embodiment

Figure 7:
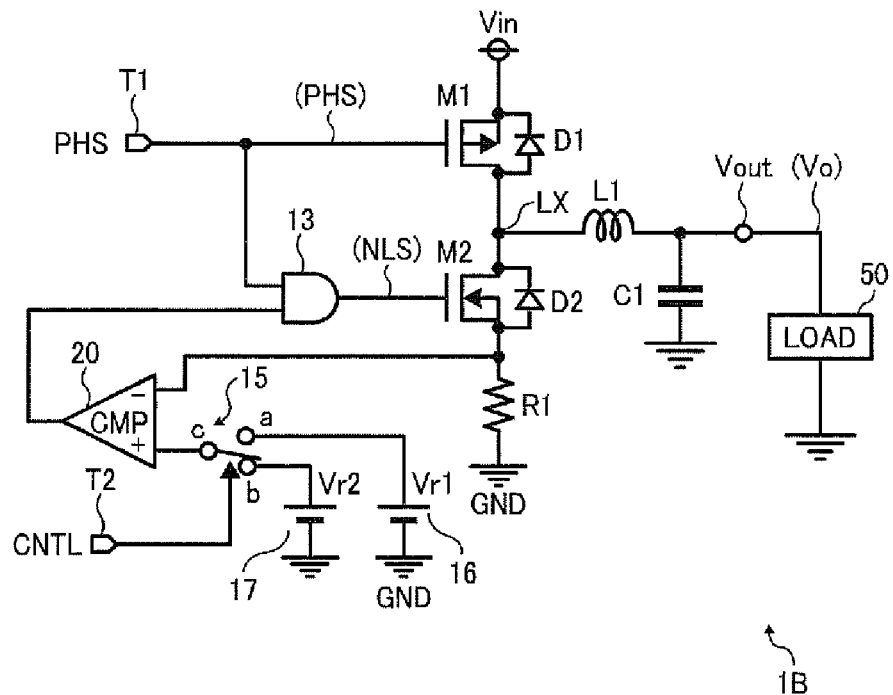
FIG. 7 illustrates circuitry of an output portion of a DC-DC converter according to another embodiment.

Next, a third embodiment of the present invention is described below. FIG. 7 illustrates circuitry of an output portion of a DC-DC converter 1B according to the third embodiment.

The third embodiment differs from the first embodiment in that the configuration shown in FIG. 7 includes one comparator 20 instead of the two comparators 11 and 12, and the switch 15 is disposed between a non-inverting input terminal of the comparator 20 and the first reference voltage Vr1 or the second reference voltage Vr2. An output terminal of the comparator 20 is connected to the second input terminal of the AND circuit 13, and an inverting terminal of the comparator 20 is connected to a junction node between the source of the synchronous rectification transistor M2 and the resistor R1. The comparator 20 serves as both a first reference voltage output device and a second reference voltage output device.

The circuit when the common contact c is connected to the contact a in the switch 15 in FIG. 7 is the same as the circuit when the common contact c is connected to the contact a in the switch 15 in FIG. 1. Additionally, the circuit when the common contact c is connected to the contact b in the switch 15 in FIG. 7 is the same as the circuit when the common contact c is connected to the contact b in the switch 15 in FIG. 1. Therefore, the description of operations according to the present embodiment is omitted.

In the third embodiment shown in FIG. 7, the DC-DC converter needs only one comparator, enabling further downscaling of the circuitry.

Fourth Embodiment

Figure 8:
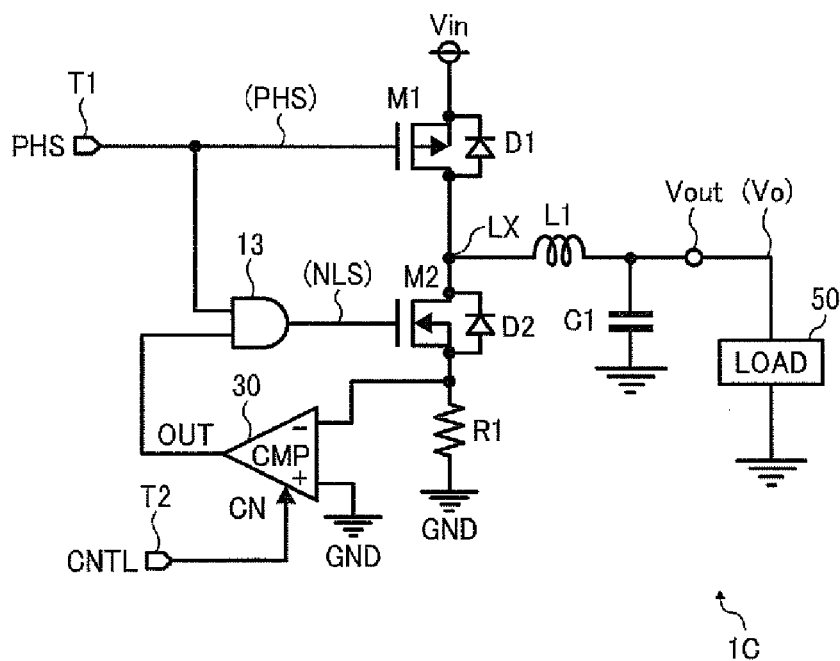
FIG. 8 illustrates circuitry of an output portion of a DC-DC converter according to another embodiment.

FIG. 8 illustrates circuitry of an output portion of a DC-DC converter 1C according to a fourth embodiment. The fourth embodiment differs from the second embodiment shown in FIG. 5 in that an input offset voltage of a comparator 30 functions as both the first reference voltage Vr1 and the second reference voltage Vr2. The control signal CNTL is inputted to a control terminal CN of the comparator 30.

Figure 9A:
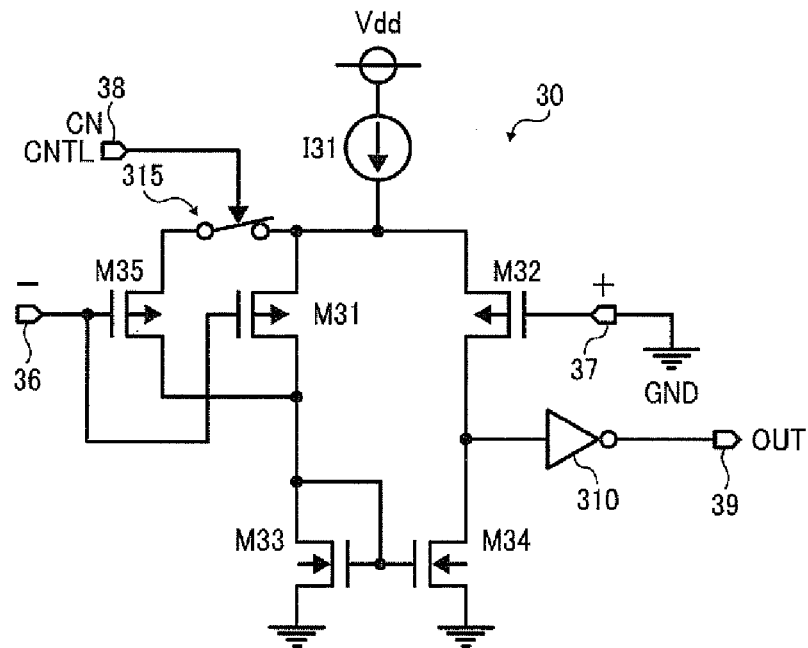
FIGS. 9A and 9B are diagrams illustrating circuitry of an output portion of the comparator used in the DC-DC converters shown in FIGS. 8 and 11, respectively.
Figure 9B:
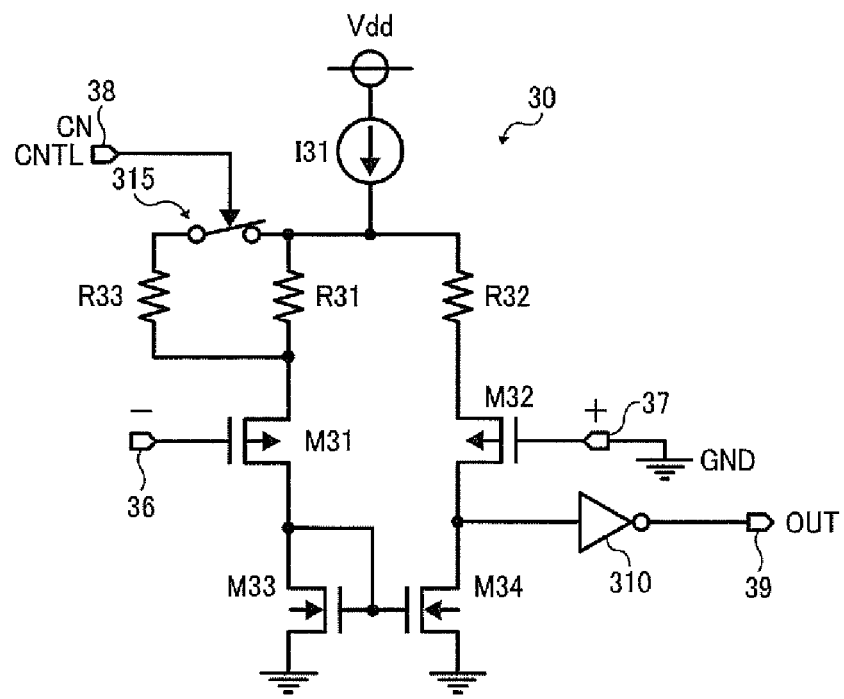

FIGS. 9A and 9B are diagrams illustrating circuitry of an output portion of the comparator 30. Initially, a configuration shown in FIG. 9A is described below. FIG. 9A illustrates circuitry of the comparator 30A, that is, one configuration of the comparator 30.

The comparator 30A includes P-channel MOS transistors M31, M32, and M35, N-channel MOS transistors M33 and M34, an electric current source I31, a switch 315 and an inverter 310. A terminal 36 with − mark represents an inverting input terminal of the comparator 30A, a terminal 37 with + mark represents a non-inverting terminal thereof, a terminal 37 with OUT mark represents an output terminal thereof, a terminal with CN mark represents the control terminal CN thereof.

The PMOS transistors M31 and M32 are differential input transistors of a differential amplification circuit, and both transistors have similar characteristics. Sources of the PMOS transistors M31 and M32 are commonly connected with the electric current source I31 and are supplied with a bias current from the electric current source I31. A gate of the PMOS transistor M31 is connected to the inverting input terminal 36, and a gate of the PMOS transistor M32 is connected to the non-inverting input terminal 37.

The NMOS transistors M33 and M34 form a current mirror circuit that is connected to gates of PMOS transistors M31 and M32, and the NMOS transistors M33 and M34 are formed as a load of the differential amplification circuit. The output voltage of the differential amplification circuit is outputted from the drain of the PMOS transistor M32 that is connected to an input terminal of the inverter 31. An output from the inverter 31 is outputted from the output terminal 39 as the output voltage Vout.

A gate and a drain of the PMOS transistor M35 are commonly connected to the PMOS transistor 31. The switch 315 is connected between a source of the PMOS transistor M35 and a source of the PMOS transistor M31 and turns on/off according to the control signal CNTL.

When the switch 315 is off, because the PMOS transistor M31 and M 32 have similar characters, the input offset voltage is almost 0 V. The state is similar to the state in which the first reference voltage Vr1 is selected in the circuitry shown in FIG. 7.

When the switch 315 is turned on, the PMOS transistor M35 is connected in parallel to the PMOS transistor M31. Then, the area of the transistor in the inverting input terminal side is increased, a balance between the input terminals is lost, and the input offset voltage is generated.

In other words, when the voltage of the inverting input terminal is equal to the voltage of the non-inverting input terminal, on the inverting input side the PMOS transistor M35 and PMOS transistor M31 are connected in parallel, and thus a compound drain electric current is larger than a drain electric current of the input transistor M32 on the non-inverting input side, and therefore, the output signal of the comparator 30 becomes high.

In order to switch the output signal of the comparator 30 low, the electrical potential at the inverting input terminal is required to be higher than the electrical potential at the non-inverting input terminal by an amount corresponding to the offset voltage. That is, the offset voltage works as the second reference voltage shown in FIG. 7, and the state in which the switch 315 is on is similar to the configuration when the second reference voltage Vr2 is selected.

The amount of the offset voltage can depend on the element size of the PMOS transistor M35 connected in parallel.

It is to be noted that, excepting when the first reference voltage is set to 0 V, the transistors M131 and M32 working as a differential amplification circuit should have slightly different characteristics so that the input offset voltage is generated even when the switch 315 is off.

FIG. 9B shows circuitry illustrating a comparator 30B, that is, another configuration of the output portion of the comparator 30.

The difference between the configuration shown in FIG. 9B and the configuration shown in FIG. 9A is that the PMOS transistor M35 is removed, the resistors R31 and R32 are connected respectively between the electric current source I31 and the PMOS transistor M31 and between the electric current source I31 and the PMOS transistor M32, and the resistor R31 is connected in parallel to a series circuit including the resistor R33 and the switch 315.

The PMOS transistors M31 and M32 have similar characteristics, and the resistors R31 and R32 have almost identical resistance values.

While the switch 315 is off, the input offset voltage becomes almost 0 V. The state is similar to the configuration in which the first reference voltage Vr1 is selected in the circuitry shown in FIG. 7.

When the switch 315 is turned on, since the resistor R31 is connected in parallel to the resistor R33, the resistance value between the source of the PMOS transistor M31 and the electric current source I31 is decreased, generating the input offset voltage.

That is, when the electric potentials at the inverting input terminal and the non-inverting input terminal are equal, the electric current at the drain of the PMOS transistor M31 is larger than the electric current at the drain of the PMOS transistor M32 and the output signal of the comparator 30 becomes high. In order to switch the output signal of the comparator 30 to low, the electric potential at the inverting input terminal is required to be higher than the electric potential at the non-inverting terminal by an amount corresponding to the offset voltage. That is, the offset voltage works as the second reference voltage Vr2 shown in FIG. 7, and the state in which the switch 315 is off is similar to the configuration when the second reference voltage Vr2 is selected in FIG. 7. The size of the offset voltage can be determined by the resistance value of the resistor R33 that is connected in parallel to the resistor R31. The comparator 30 serves as both a first reference voltage output device and a second reference voltage output device.

Although the two configurations are described as input portions of the comparator 30, the present embodiment is not limited to these configurations, and other configuration are applicable as long as the input offset voltage can be changed by the switch 315.

Fifth Embodiment

Figure 10:
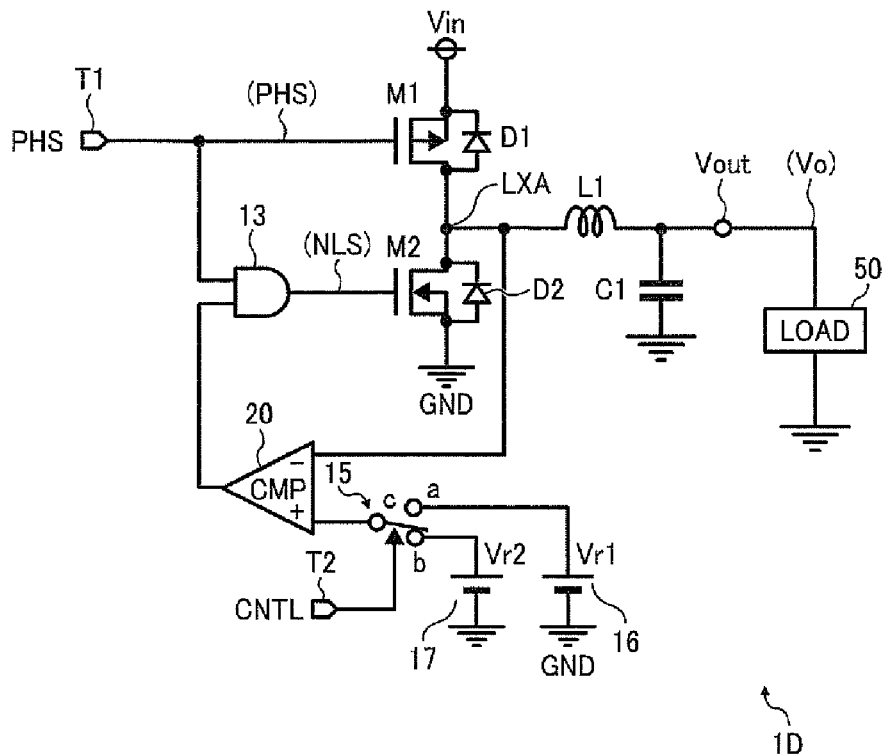
FIG. 10 illustrates circuitry of an output portion of a DC-DC converter according to another embodiment.

FIG. 10 is circuitry illustrating another configuration of an output portion of a DC-DC converter 1D. The fifth embodiment differs from the second embodiment shown in FIG. 5 in that the configuration shown in FIG. 10 includes the comparator 20 instead of the two comparators 11 and 12, and a switch 15 is disposed between the first reference voltage Vr1 and the second reference voltage Vr2. An output signal of the comparator 20 is input to the second terminal of the AND circuit 13, and inverting input terminal is connected to the junction node LXA between the synchronous rectification transistor M2 and the inductor L1.

The circuit when the common contact c is connected to the contact a in the switch 15 in FIG. 10 in response to the control signal CNTL is the same as the circuit when the common contact c is connected to the contact a in the switch 15 in FIG. 5. Additionally, the circuit when the common contact c is connected to the contact b in the switch 15 in FIG. 10 is the same as the circuit when the common contact c is connected to the contact b in the switch 15 in FIG. 5. Therefore, the description of operations according to the present embodiment is omitted.

In the fifth embodiment shown in FIG. 10, the configuration of the DC-DC converter needs only one comparator, enabling further downscaling of the circuitry.

Sixth Embodiment

Figure 11:
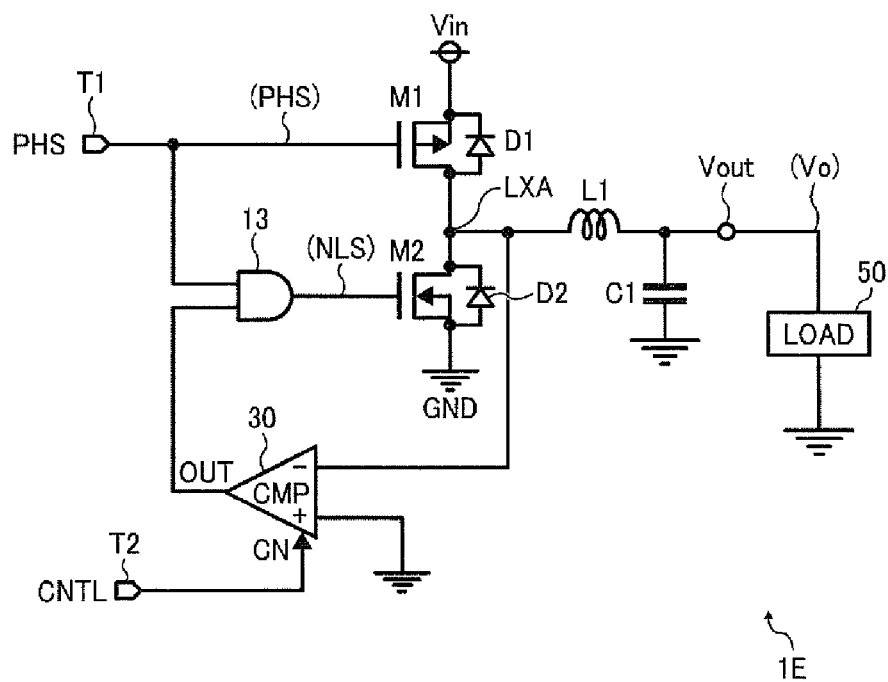
FIG. 11 illustrates circuitry of an output portion of a DC-DC converter according to another embodiment.

FIG. 11 is circuitry illustrating a configuration of an output portion of a DC-DC converter 1E according to another embodiment. The difference between the configuration shown in FIG. 11 and that shown in FIG. 10 is that the first reference voltage Vr1 and the second reference voltage Vr2 are implemented by the input offset of the comparator 30. The control signal CNTL is transmitted to the control terminal CL in the comparator 30.

The configuration of the comparator 30 shown in FIG. 11 is similar to the comparator 30 shown in FIG. 10, and therefore, the description of the configuration according to present embodiment is omitted.

Although in the above described embodiments the PWM control is used as the control method for the DC-DC converter, the control method for the DC-DC converter is not limited thereto, and other control mechanisms such as a PFM control mechanism can be utilized.

Numerous additional modifications and variations are possible in light of the above teachings. It is therefore to be understood that, within the scope of the appended claims, the disclosure of this patent specification may be practiced otherwise than as specifically described herein.

What is claimed is:

1. A DC-DC converter to control an output voltage, comprising:
a switching transistor including a first terminal connected to a power input terminal;
an inductor including a first end connected to a second terminal of the switching transistor and a second end connected to an output terminal;
a synchronous rectification transistor including a first terminal connected to a junction node between the switching transistor and the inductor and a second terminal connected to a ground terminal;
a first electric current detector to detect whether or not an electric current flowing through the synchronous rectification transistor is larger than a first electric current;
a second electric current detector to detect whether or not the electric current flowing through the synchronous rectification transistor is larger than a second electric current that is larger than the first electric current and flows in a positive direction; and
a selection mechanism to select one of the first electric current detector and the second electric current detector in accordance with a control signal,
wherein the synchronous rectification transistor is turned off by an output signal from one of the first electric current detector and the second electric current detector that is selected, and
while the synchronous rectification transistor is on, a direction of the electrical current flowing through the synchronous rectification transistor is regarded as the positive direction when the electrical current flows from the junction node to the ground terminal and as a negative direction when the electrical current flows from the ground terminal to the junction node.

2. The DC-DC converter according to claim 1, wherein the first electric current is 0 A or near 0 A.

3. The DC-DC converter according to claim 1, wherein the control signal causes the selection mechanism to select the output signal from the second electric current detector for a predetermined time period when at least one of turning on the DC-DC converter, turning off the DC-DC converter, and changing the output voltage is performed, and to select the output signal from the first electric current detector when the DC-DC converter executes an operation other than turning on the DC-DC converter, turning off the DC-DC converter, and changing the output voltage.

4. The DC-DC converter according to claim 3, wherein the predetermined time period is not shorter than a time period extending from when at least one of turning on the DC-DC converter, turning off the DC-DC converter, and changing the output voltage is performed until when the output voltage reaches the predetermined voltage.

5. A DC-DC converter to control an output voltage comprising:
a switching transistor including a first terminal connected to a power input terminal;
an inductor including a first end connected to a second terminal of the switching transistor and a second end connected to an output terminal;
a synchronous rectification transistor including a first terminal connected to a junction node between the switching transistor and the inductor and a second terminal connected to a ground terminal;
a first voltage detector to detect whether or not a voltage of a junction node between the switching transistor and the inductor is higher than a first voltage;
a second voltage detector to detect whether or not a voltage of the junction node between the switching transistor and the inductor is higher than a second voltage that is higher than the first voltage and is a positive voltage; and
a selection mechanism to select one of the first voltage detector and the second voltage detector in accordance with a control signal,
wherein the synchronous rectification transistor is turned off with an output signal from one of the first voltage detector and the second voltage detector that is selected.

6. The DC-DC converter according to claim 5, wherein the first voltage is 0 V or near 0 V.

7. The DC-DC converter according to claim 5, wherein the control signal causes the selection mechanism to select the output signal from the second voltage detector for a predetermined time period when at least one of turning on the DC-DC converter, turning off the DC-DC converter, and changing the output voltage is performed and to select the output signal from the first voltage detector when the DC-DC converter executes an operation other than turning on the DC-DC converter, turning off the DC-DC converter, and changing the output voltage.

8. The DC-DC converter according to claim 7, wherein the predetermined time period is not shorter than a time period extending from when at least one of turning on the DC-DC converter, turning off the DC-DC converter, and changing the output voltage is performed, until when the output voltage reaches the predetermined voltage.

9. A DC-DC converter to control an output voltage, comprising:
a switching transistor including a first terminal connected to a power input terminal;
an inductor including a first end connected to a second terminal of the switching transistor and a second end connected to an output terminal;
a synchronous rectification transistor including a first terminal connected to a junction node between the switching transistor and the inductor and a second terminal connected to a ground terminal;
a current-voltage converting device to convert an electric current flowing through the synchronous rectification transistor into a voltage;
a first reference voltage output mechanism to output a first reference voltage that is 0 V or near 0 V;
a second reference voltage output mechanism to output a second reference voltage that is higher than the first reference voltage and is positive;
a selection mechanism to receive both the first reference voltage and the second reference voltage and output one of the first reference voltage and the second reference voltage in accordance with a control signal; and
a comparator to compare the output voltage from the current-voltage converting device with the first reference voltage or the second reference voltage outputted from the selection mechanism,
the comparator outputting a signal to turn off the synchronous rectification transistor when detecting that the output voltage from the current-voltage converting device is not lower than the first reference voltage or the second reference voltage selected by the selection mechanism.

10. The DC-DC converter according to claim 9, wherein the control signal causes the selection mechanism to select the output voltage from the second reference voltage for a predetermined time period when at least one of turning on the DC-DC converter, turning off the DC-DC converter, and changing the output voltage is performed and to select the output voltage from the first reference output mechanism when the DC-DC converter executes an operation other than turning on the DC-DC converter, turning off the DC-DC converter, and changing the output voltage.

11. The DC-DC converter according to claim 10, wherein the predetermined time period is not shorter than a time period extending from when at least one of turning on the DC-DC converter, turning off the DC-DC converter, and changing the output voltage is performed until when the output voltage reaches the predetermined voltage.

12. The DC-DC converter according to claim 9, wherein the first reference voltage output mechanism and the second reference voltage output mechanism are formed by a changing mechanism to change an input offset voltage of the comparator, the first reference voltage and the second reference voltage function as the input offset voltage of the comparator, and the input offset voltage is changed in accordance with the control signal.

* * * * *